United States Patent

[11] 3,574,899

[72] Inventor Julian V. Fisher
 Carpentersville, Ill.
[21] Appl. No. 855,107
[22] Filed Sept. 4, 1969
[45] Patented Apr. 13, 1971
[73] Assignee Illinois Tool Works Inc.
 Chicago, Ill.

[54] SNAP FASTENER
 11 Claims, 12 Drawing Figs.
[52] U.S. Cl..................................................... 24/73,
 85/80, 151/41.75, 248/27
[51] Int. Cl.....................................................F16b 39/28,
 F16b 13/06
[50] Field of Search.......................................... 85/70, 72,
 80; 151/41.75; 248/27; 24/73

[56] References Cited
UNITED STATES PATENTS
| 2,560,961 | 7/1951 | Knohl | 85/80 |
| 2,836,214 | 5/1958 | Rapata | 85/80 |
| 3,143,916 | 8/1964 | Rice | 85/71 |
| 3,415,155 | 12/1968 | Riddell et al. | 85/80 |
| 3,508,593 | 4/1970 | Gill | 151/41.75 |

Primary Examiner—Donald A. Griffin
Attorney—Olson, Trexler, Wolters and Bushnell ABSTRACT: The present invention relates generally to one-piece fasteners of the type having a central longitudinal aperture for a work-supporting screw member and adapted to be snapped into association with a noncircular workpiece aperture. The embodiment of the invention disclosed herein includes an elongate, substantially rigid or firm shank section having a longitudinal screw-accommodating aperture and laterally flexible shank sections superimposing the opposite sides of the rigid shank section. As the fastener is snapped into position within a work aperture, these flexible shank sections yield inwardly to facilitate initial insertion, peripheral shoulders intermediate the extremities of the flexible shank sections automatically flex outwardly as an incident to the movement of the shank sections for securing the fastener against axial movement in one direction and other shoulder means secure the fastener against movement in the opposite direction.

Patented April 13, 1971
3,574,899
2 Sheets-Sheet 1
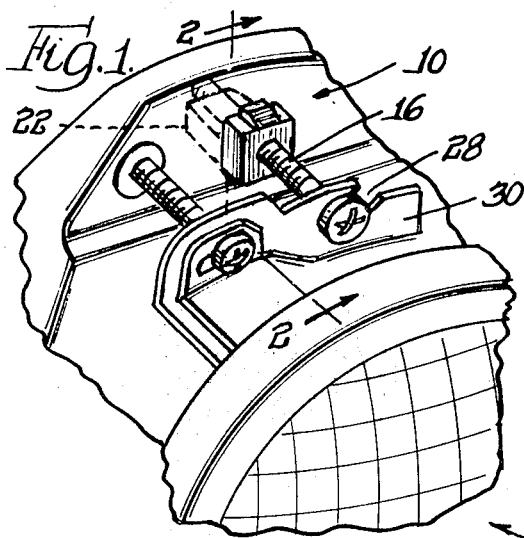
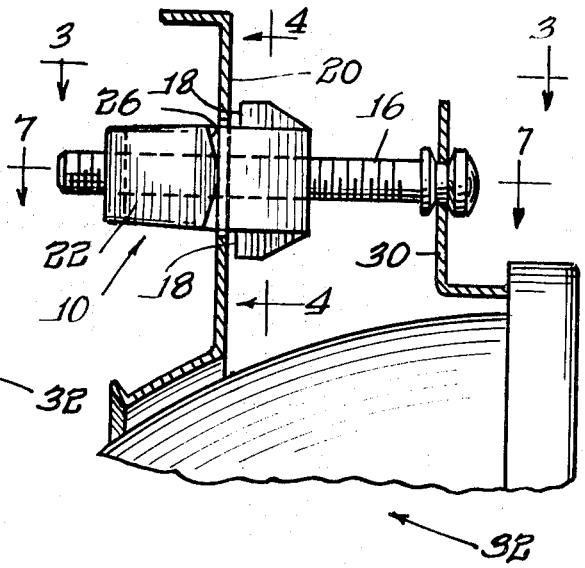
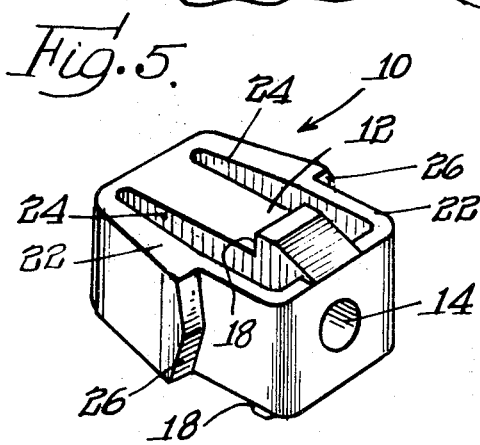
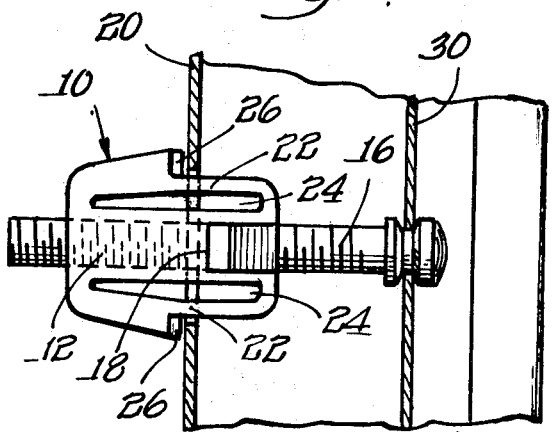
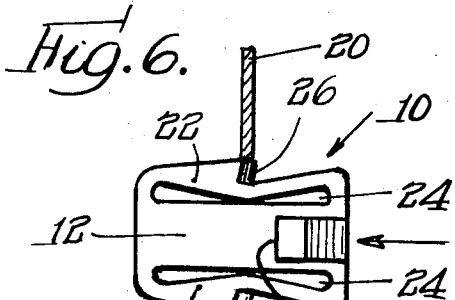
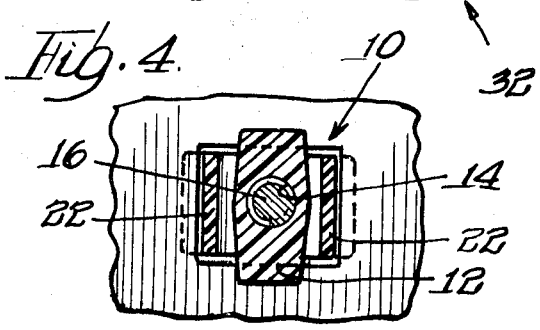
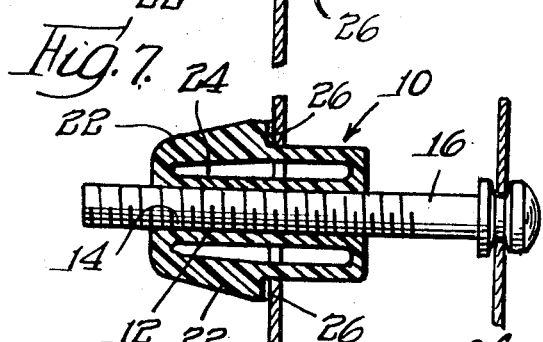
Inventor
Julian V. Fisher
By: Olson, Trexler, Wolters & Bushnell attys Patented April 13, 1971
3,574,899
2 Sheets-Sheet 2
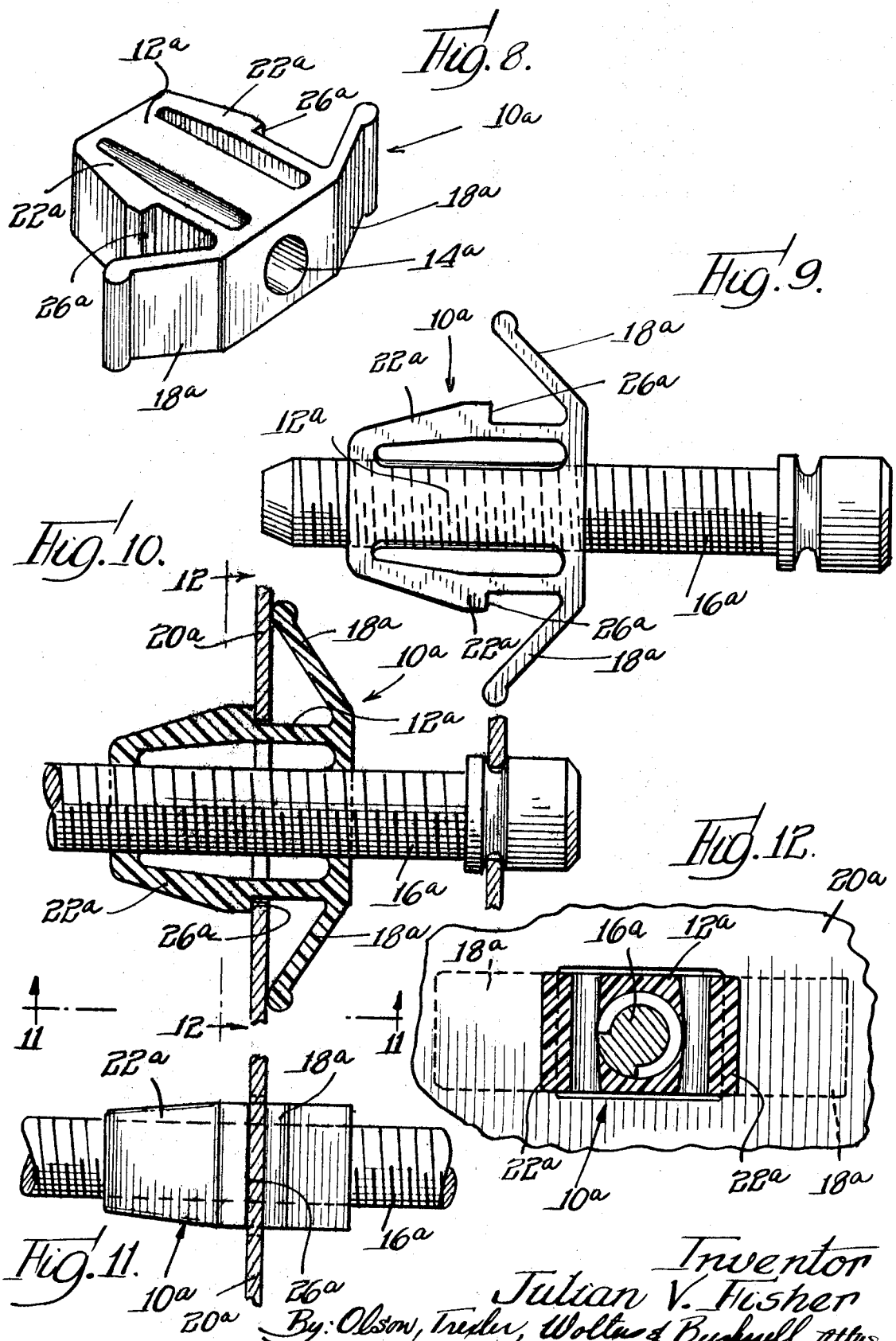
Inventor
Julian V. Fisher
By Olson, Trexler, Wolters & Bushnell attys

SNAP FASTENER

It is an important object of the present invention to provide a novel and improved one-piece fastener member which may be snapped into a noncircular work aperture in readiness to accommodate a complementary work-supporting screw member.

More specifically, the present invention contemplates an improved one-piece fastener of the type referred to above which will withstand relatively heavy loads to which a screw member carried thereby may be subjected.

The present invention contemplates a fastener as set forth above wherein novel means is incorporated to facilitate axial insertion and subsequent automatic interlocking of the fastener within an apertured workpiece or panel.

It is a further object of the present invention to provide a relatively simple snapin-type fastener which may be produced by practicing conventional plastic molding methods, thereby enabling the fastener to be produced at minimum manufacturing costs.

The foregoing and other objects and advantages will be more apparent from the following detailed description when considered in connection with the accompanying drawing, wherein:

FIG. 1 is a perspective view of a fastener of the type contemplated by the present invention shown in operative association with a frame for supporting an automobile headlight;

FIG. 2 is an enlarged fragmentary vertical sectional view taken substantially along the line 2–2 of FIG. 1;

FIG. 3 is a horizontal sectional view taken substantially along the line 3–3 of FIG. 2;

FIG. 4 is a transverse sectional view taken substantially along the line 4–4 of FIG. 2;

FIG. 5 is a perspective view of the fastener illustrated in FIGS. 1–4 inclusive, detached from the work supporting screw member;

FIG. 6 is a side elevational view disclosing the fastener during its initial collapsed insertion within a work aperture;

FIG. 7 is a horizontal sectional view taken substantially along the line 7–7 of FIG. 2 to illustrate the fastener when finally inserted within the work aperture;

FIG. 8 is a perspective view of a one-piece plastic fastener of modified design;

FIG. 9 is an elevational view disclosing the fastener of FIG. 8 associated with a supporting screw member;

FIG. 10 is a view similar to FIG. 9 showing the one piece plastic fastener member in section and also in operative association with an apertured workpiece;

FIG. 11 is an elevational view of the fastener taken substantially along the line 11–11 of FIG. 10; and FIG. 12 is a transverse sectional view taken substantially along the line 12–12 of FIG. 10.

Referring to the drawing more in detail, wherein like numerals have been employed to designate similar parts throughout the various figures, it will be seen that one embodiment of the fastener contemplated by the present invention is designated generally by the numeral 10. The fastener 10 is in the nature of a shank member which includes a central relatively rigid, elongate shank section 12. It will be noted that the shank section 12 is of polygonal cross section and is provided with a central aperture 14 for accommodating a work supporting screw member 16. Projecting laterally from opposite sides of the shank section 12 at one extremity thereof are oppositely disposed shoulder members 18 adapted to engage one surface of a workpiece or lamp supporting frame member 20.

Attention is now directed to laterally flexible elongate shank sections 22 superimposing opposite sides of shank section 12 and spaced therefrom by elongate recesses 24. Each of the laterally flexible shank sections 22 is integrally joined with the opposite extremities of the relatively rigid shank section 12 as clearly shown in the drawing. Each of the laterally flexible shank sections 22 carry shoulders 26. These shoulders 26 are spaced axially from and disposed at 90° with respect to the previously mentioned shoulder 18. Thus the shoulders 26 are adapted to interlock with the opposite side of said workpiece. The cross-sectional shape of the combined shank sections 12 and 22 is polygonal and it will be noted that the peripheral surfaces defined by the entering extremity of the shank sections 22 is of reduced cross section to facilitate initial insertion of the fastener within a work aperture.

To illustrate one practical application or environment in which the fastener of the preset application has proven very satisfactory, FIGS. 1—3 inclusive show the fastener in association with an automobile headlamp support. The previously mentioned workpiece or frame member 20 carries a plurality of circumferentially spaced fasteners 10. The outer or headed extremity of the screw member 16 associated with each fastener is received by an opening or slot 28, FIG. 1, of a headlamp supporting frame 30. The headlamp is indicated generally by the numeral 32.

The fastener or shank member 10 is initially inserted within the work aperture in the manner shown in FIG. 6. The work aperture is preferably noncircular and is complementary to the cross-sectional shape of the fastener 10. Initial insertion of the fastener causes the shoulder 26 to shift radially inwardly and upon completion of insertion, automatically to spring outwardly into interlocking relation with a marginal surface area adjacent the work aperture. In this position, the relatively fixed shoulders 18 cooperate to engage the opposite surface of the workpiece and thereby secure the fastener against axial dislodgement. The screw member 16 inserted within the aperture 10 may be longitudinally adjusted to properly position the headlamp supporting frame 30. In some instances it may be preferable to permit the screw member to form its own thread within the plastic fastener member 10 and in other instances it may be desirable to provide preformed screw accommodating thread convolutions within the longitudinal aperture 14. In each instance it is essential to insure a firm frictional fit between the thread convolutions of the screw and the complementary thread convolutions within the longitudinally apertured shank section 12. As the screw 16 is tightened the shoulders 26 are brought into impingement with the adjacent surface area of the workpiece 20. It has been found desirable to form the shoulder 26 in the manner illustrated in FIG. 5. In this connection it will be noted that the shoulders 26 are preferably formed by two slightly inclined shoulder surfaces which meet at a common work-engaging apex. By this construction any slight misalignment of the apertures 28 of the frame 30 and the aperture 14 in the fastener 10 will not affect the firm clamping fit of the fastener within its supporting workpiece or frame 20.

In FIGS. 8—12 inclusive, a modified form of fastener contemplated by the present invention is designated generally by the numeral 10a. Like the fastener 10 previously described the fastener 10a is in the nature of a shank member which includes a central, relatively rigid or firm elongate shank section 12a. The shank section 12a is provided with a central aperture 14a for accommodating a work supporting screw member 16a. Projecting laterally from opposite sides of the shank section 12a at one extremity thereof are oppositely disposed flexible arm members 18a. The free extremities of these arms 18a provide abutments for yieldingly engaging one side of a worksheet or panel member 20a. The free extremities of the arms 18a have the same function as the previously described shoulder 18 disclosed in FIGS. 1—7 inclusive.

The fastener member 10a is also provided with laterally flexible elongate sections 22a. The provision of elongate recesses 24a permit sufficient collapsing of the shank sections 22a to facilitate axial insertion of the fastener similarly to the fastener 10 as shown in FIG. 6. Each of the laterally flexible shank sections 22a is integrally joined with the opposite extremities of the relatively rigid shank section 12a and is provided with shoulders 26a which function similarly to the previously described shoulders 26.

As the fastener is telescopically associated with a complementary aperture in the workpiece 20a the advancing free extremities of the abutment arms 18a are ultimately brought into contact with one side of the work surface, and continued axial shifting of the fastener will result in the shoulders 26a engaging the opposite side of the workpiece as clearly shown in FIG. 10. Thus the flexible arms 18a serve to continually urge the shoulders 26a into engagement with the workpiece, thereby assuring firm positioning of the fastener within the workpiece. It should also be understood that the shank sections 12a and 22a in combined cross section present an outer periphery of noncircular, or polygonal, shape. The work aperture has a shape which is complementary to the cross-sectional shape of the fastener. In the previously described fastener 10, the shoulders 26 and the shoulders 18 are disposed at 90° with respect to each other, whereas in the fastener 10a just described, the shoulders 26a and the shoulders provided at the free extremity of the flexible arms 18a are positioned on the same side of the fastener. The fastener 10a may be used as a lamp support like the fastener 10, but obviously may be used in other applications where a workpiece is provided with a suitable work accommodating aperture.

From the foregoing it will be apparent that the present invention contemplates the provision of a very simple yet practical and sturdy fastener of one-piece construction. Multipiece fasteners which have heretofore been relatively expensive to produce do not have the gripping or holding firmness of the fastener contemplated by the present invention. By having the elongate, central shank section 12, sufficient thread engagement between the fastener and the screw member is assured to withstand relatively high, longitudinal stresses experienced by the complementary screw member 16. Also, the structural design of the fastener assures effective resistance to substantial lateral forces to which the screw member may be subjected. By having the elongate, laterally flexible shank sections integrally secured at opposite extremities to the central, relatively rigid shank section 12, the required flexibility of the sections 22 is assured without the potential hazard of misalignment of said sections as might occur in instances where one extremity of the section or arm is free. As previously stated, the fastener contemplated hereby may be produced at a minimum cost by practicing conventional plastic molding methods.

I claim:

1. A one-piece plastic snapin-type fastener for application to an apertured workpiece including an elongate, substantially rigid shank section having a central longitudinal screw accommodating aperture, longitudinal, laterally flexible shank sections superimposing and normally spaced from opposite sides of said rigid shank section, each of said laterally flexible sections being integrally connected at opposed extremities to said rigid section, said shank sections in combined cross section presenting an outer periphery of noncircular shape defining a cross-sectional area which is reduced toward the entering extremity of the fastener to facilitate initial insertion thereof within a complementary work aperture, peripheral shoulder means intermediate the extremities of said flexible shank sections and adapted to shift radially inwardly upon initial insertion within a workpiece aperture and automatically to spring outwardly into interlocking relation with a marginal surface area adjacent said aperture when insertion is completed, and second shoulder means spaced axially from said first shoulder means toward the trailing end of the fastener for interlocking with the opposite marginal work surface area.

2. A one-piece plastic snapin-type fastener as set forth in claim 1, wherein the oppositely disposed peripheral surfaces defined by the laterally flexible shank sections are inclined from the vicinity of the peripheral shoulder means thereof toward the entering extremity to facilitate initial insertion within a work aperture.

3. A one-piece plastic snapin-type fastener as set forth in claim 1, wherein the peripheral shoulder means associated with the flexible shank sections are disposed at 90° with respect to the second shoulder means spaced axially therefrom.

4. A one-piece plastic snapin-type fastener as set forth in claim 1, wherein the second shoulder means extends radially outwardly from opposite peripheral surfaces of the substantially rigid shank section.

5. A one-piece plastic snapin-type fastener as set forth in claim 4, wherein the oppositely disposed peripheral surfaces of the substantially rigid shank section from which the second shoulder means extend are substantially parallel.

6. A one-piece plastic snapin-type fastener as set forth in claim 4, wherein the oppositely disposed peripheral surfaces of the substantially rigid shank section from which the second shoulder means extend are separated from each other by a distance substantially equal to the width of the flexible shank sections.

7. A one-piece plastic snapin-type fastener as set forth in claim 1, wherein the peripheral surfaces defined by the laterally flexible shank sections are inclined toward each other in the vicinity of the shoulder means thereof, and the width of said laterally flexible shank sections is uniform throughout substantially the entire axial extent thereof.

8. A one-piece plastic snapin-type fastener as set forth in claim 7, wherein the oppositely disposed edges of the flexible shank members and the adjacent peripheral surfaces of the rigid shank member are positioned within a common plane.

9. A one-piece plastic snapin-type fastener as set forth in claim 1, wherein the second shoulder means is axially yieldable.

10. A one-piece plastic snapin-type fastener as set forth in claim 1, wherein the second shoulder means includes oppositely disposed, laterally flexible arms, the free extremities of which provide work-engaging surface areas.

11. A one-piece plastic snapin-type fastener as set forth in claim 1, wherein the first and second shoulder means includes a pair of axially spaced shoulder members on one side of the fastener and a pair of oppositely disposed shoulder members on the opposite side of the fastener.